United States Patent

Walsh, Jr. et al.

[11] Patent Number: 5,171,549
[45] Date of Patent: Dec. 15, 1992

[54] PROCESS FOR DECREASING THE LEVEL OF IMPURITIES IN ZIRCONIUM CHLORIDE, TITANIUM CHLORIDE AND HAFNIUM CHLORIDE

[75] Inventors: Ronald E. Walsh, Jr., Corvallis; Peter W. Krag, Albany; Roy E. Blackstone, Turner; Duane L. Hug, Albany, all of Oreg.

[73] Assignee: Teledyne Wah Chang Albany, Albany, Oreg.

[21] Appl. No.: 704,120

[22] Filed: May 22, 1991

[51] Int. Cl.[5] ............... C01G 23/00; C01G 25/00; C01G 27/00
[52] U.S. Cl. .................. 423/79; 423/69; 423/72; 423/75; 423/76; 423/81; 423/147; 423/149; 423/324; 423/341; 423/492; 423/210
[58] Field of Search .......... 423/69, 75, 76, 77, 423/79, 81, 83, 492, 210, 72, 147, 149, 324, 341

[56] References Cited

U.S. PATENT DOCUMENTS

| | | | |
|---|---|---|---|
| 2,184,884 | 12/1939 | Muskat et al. | 423/75 |
| 3,989,510 | 11/1976 | Othmer | 423/84 |
| 4,840,774 | 6/1989 | Campbell et al. | 423/75 |
| 4,979,967 | 12/1990 | Walter et al. | 55/259 |

FOREIGN PATENT DOCUMENTS 3320641 12/1984 Fed. Rep. of Germany .

*Primary Examiner*—Theodore Morris
*Assistant Examiner*—Edward Squillante
*Attorney, Agent, or Firm*—Shoemaker and Mattare Ltd.

[57] ABSTRACT

An improved halogenator process and system is provided which significantly and economically decreases the level of impurities in the processing of various refractory metals and their halides and particularly hafnium tetrachloride which is condensed from gases produced by the chlorination of Zircon.

5 Claims, 2 Drawing Sheets

FIG. I.

PROCESS FOR DECREASING THE LEVEL OF IMPURITIES IN ZIRCONIUM CHLORIDE, TITANIUM CHLORIDE AND HAFNIUM CHLORIDE

BACKGROUND OF THE INVENTION

Conventional zircon sand ($ZrSiO_4$) halogenators, such as chlorinators, produce a product stream of major components, namely zirconium tetrachloride, hafnium tetrachloride and silicon tetrachloride and contaminating minor components. Among the contaminating minor components are volatile chloride compounds which contain iron, aluminum, uranium, phosphorus, titanium, and vanadium. Some finely divided solids, carbon and oxides, are also minor impurities in the product stream. The product stream then contacts a first condenser where $ZrCl_4/HfCl_4$ is largely condensed and most $SiCl_4$ goes further downstream to another condenser. Some of the minor impurities, however, condense with $ZrCl_4/HfCl_4$. These impurities, such as chlorides of iron, uranium, and phosphorus, must be removed at some cost in subsequent operations, see for instance those disclosed in German Patent 1,082,240.

One principal object of the invention is to decrease the level of impurities in zirconium/hafnium tetrachloride ($ZrCl_4/HfCl_4$) condensed from gas produced by carbochlorination of zircon. Because certain of these impurities require removal in further processing of $ZrCl_4/HfCl_4$, their removal at this earlier stage may be advantageous. A reducing gas mixture can be effectively used to react with certain of the impurities forming condensible species which can then be filtered from the gas stream prior to condensation of $ZrCl_4/HfCl_4$ (1). These impurities include phosphorus, (1) iron, and uranium. Certain other impurities react to form gaseous products which are more volatile than the $ZrCl_4/HfCl_4$ and are non-condensible condensible chlorides.

A still further object of this invention is to provide new processes for decreasing impurity level in the chlorination process for zircon which processes are cost effective, safe, and easily reproducible.

Zirconium occurs naturally together with hafnium, typically such that (100) (Hf/(Zr+Hf)) 2.0. The combination of unseparated zirconium and hafnium has a number of uses as chemicals, e.g., for paper, ceramics and metal matrix composites, or as metal in corrosive environments, e.g., Zircadyne 702 for acetic acid plants.

Nuclear grade zirconium metal (Hf/(Hf+Zr) <100 ppm) alloys, e.g., Zircaloy 4, find application for internal construction materials in nuclear reactors, due to the property of zirconium having a low thermal neutron capture cross section. Hafnium metal finds application as a control rod in nuclear reactors owing to its high thermal neutron capture cross section. Hafnium is also used in superalloys where high temperature strength is needed.

Traditionally, where zirconium/hafnium is destined for use in nuclear applications, its processing begins with the carbochlorination of an ore, typically zircon sand. Zirconium ore may also be opened by a fluoride process. Processing of zirconium and hafnium for non-nuclear applications may also begin with carbochlorination of an ore. The carbochlorination process for zircon (Zr(Hf)SiO_4) sand is based on the process of chlorinating a finely divided zircon sand mixed with coke at temperature near 1000° C. The gaseous product stream $ZrCl_4/HfCl_4$ (s.p. ~331° C.) is filtered to be free of particulate matter and then condensed. Major by-product $SiCl_4$ (b.p. 57° C.) is recovered downstream in a condenser.

There are a number of impurities in the $ZrCl_4/HfCl_4$ product condensed from chlorinator off-gas. The presence of excess chlorine and phosgene create problems, aside from representing wasted chlorine, in that they must be neutralized and the resultant hypochlorite reduced. Further, they are extremely corrosive to materials of construction and represent a potential health hazard. It is difficult to continuously run a chlorinator without some means of escapement of chlorine/phosgene to product. Ferric chloride and aluminum chloride tend to co-condense with $ZrCl_4/HfCl_4$ and coat equipment with deposits which impede heat transfer. Uranium, phosphorus, silicon, titanium and compounds may contaminate the product. Traces of carbon and oxide particulate matter also contaminate the product. These contaminating materials, in addition to other contaminating impurities, must also be subsequently removed, and considerable cost and effort is required in the process.

Conventionally, many impurities are removed from crude chloride by a liquid-liquid counter current solvent extraction process (LLCCSE)[1] for separating Zr and Hf. One alternative to a LLCCSE is to sublime crude chloride one or more times in a stream of H, in N,. This removes Cl, P, U, Fe, Al, Ti, Si, Cr, V, C and oxides to an acceptable level for feed to any process stream—chemical grade, non-nuclear grade metal and nuclear grade metal. In our experience, the sublimation process is expensive in terms of energy consumed, the need for large scale equipment, and substantial expenses to maintain the equipment.

[1] James H. McClain and Stephen Shelton, Ch. 4, Zr/Hf Separation, in Reactor Handbook, Vol. 1. Materials, Ed. by C.R. Tipton, Jr., Interscience Publ, Inc., N.Y., pp. 64-73.

Other attempts to purify $ZrCl_4$ and/or $HfCl_4$ by sublimation have been made in the past. In one process, $ZrCl_4$ was soaked in $H_2$ at 250° C. prior to sublimation.[2] Fe, Cr, U, Th, Si, Ti, and most Al was removed, partially due to reduction of hydrogen reducible elements and simple distillation of impurities that boil or sublime below the s.p. of $ZrCl_4$. A hydrogen soak is not industrially practical.

[2] W. J. Kroll and W.W. Stephens, Production of Malleable Zirconium, Industrial and Engineering Chemistry, Vol. 42, 1950, pp. 395-398.

In still another process, zinc, cadmium and manganese have been used[3] to reduce contaminating iron levels. It was noted that the system should be free of chlorine. Hydrogen sublimation is more industrially practicable.

[3] British 660,397, Nov. 7, 1951, Method of Producing Pure Zirconium Halides.

Still numerous other processes are reported. $ZrCl_4$ was contacted with alkali or alkaline earth chlorides 1. where Fe, Al, Si, Ti, Mg, Ca, Cu, Ba, Na, K, $ZrOCl_2$ and C were claimed to have been removed.[4] $HfCl_4$ was contacted with a $NaCl/KCl/HfCl_4$ molten salt bath where Al, Fe, Si, Ti, Mn, Pb and B were largely removed.[5] $ZrCl_4$ was contacted with $CaCl$, at 200°-450° C. where Al and Fe were removed.[6] $ZrCl_4$ was contacted with a fused salt where Al, Fe, Ti, V, Si and Th were largely removed.[7] Contact with KCl, NaCl or NaCl/KCl in a plate column removes Fe and Al and supposedly V, U, Ti and Si.[8] The mechanism of removal is the formation of compounds, e.g., $NaCl + FeCl_3$, $NaFeCl_4$ which are stable and relatively non-volatile. They require large pieces of equipment and are subject to high maintenance costs. They do not address eliminating chlorine in the off-gas.

[4] British 771.144, Mar. 27, 1957. Improvements in or Relating to the Purification of Zirconium Tetrachloride.
[5] D. S. Fairgrieve and J. W. Fortner, Production and Purification of High Purity Hafnium Metal, J. Metals, 12, Jan. 1960, pp. 25-26.
[6] Harry Greenberg and Hyman R. Lubowitz, purification Method for Metal Halides, U.S. Pat. No. 3,053,620, Sep. 11, 1962.
[7] D. R. Spink. Fused Salt Scrubbing of Zirconium Tetrachloride, Transactions, AIME, Vol. 224, 1962, pp. 965-970.
[8] Ernest D. Lee and David F. McLaughlin, Molte Salt Scrubbing of Zirconium or Hafnium tetrachloride, U.S. Pat. No. 4,913,778, Apr. 3, 1990.

Sublimation in the presence of carbonaceous material has been attempted. Fe, Al, V, and Cr impurity levels were reduced when $ZrCl_4$ was sublimed from an intimate mix of $ZrCl_4$ and e.g., motor oil.[9] Poor $ZrCl_4$ recovery and a mixing operation are problems with that approach. Sublimation in the presence of a volatile hydrocarbon, such as pure or mixtures of ethane, ethylene, propane, propylene or butane lowered Fe, Al, Ti, and Si levels.[10] Addition of steam and a catalytic surface area enhanced this approach.[11,12] Chlorinated hydrocarbons produced in this process are problematic due to environmental concerns and potentially costly cleanup efforts.

[9] Walter Frey, Process fro the Production of Purified Anhydrous Zirconium Tetrahalide, U.S. Pat. No. 2,682,445, Jun. 28, 1954.
[10] Herman Renner, Method for the Production of Pure Zirconium Tetrachloride by Sublimation, German 1,068,683, Nov. 12, 1959.
[11] Process for the Production of Pure Zirconium Tetrachloride and Hafnium/Zirconium Tetrachloride by Sublimation, British 910,289, Nov. 14, 1962.
[12] Hans Herzog and Herman Renner, Method for the Production of Pure Zirconium Tetrachloride by Sublimation, German 1,082,240, May 24, 1960.

While hydrogen sulfide or metallic sulfides in contact with $ZrCl_4$ during sublimation reduce Fe and V impurity levels[13], the other impurity levels are not addressed. The formation of other sulfides necessarily means that they will have to be rendered innocuous and subsequently disposed of; but this would also require costly processing.

[13] James Thompson Richmond and Howard Artner Stanley Bristow, Process for the Purification of Titanium Tetrachloride or Zirconium Tetrachoride, Brit. 866,771, May 3, 1961.

The objects of this invention are dramatically accomplished by the processes disclosed herein.

SUMMARY OF THE INVENTION

The present invention encompasses injecting a stream of a reducing gas, such as a mixture of 20 Vol.% $H_2$ in nitrogen, into the gas generated by carbochlorinating zircon sand, prior to the stream's contacting the primary condenser. The products formed by reaction of said reducing gas with sand chlorinator off-gas may be condensed phases (with boiling and/or melting points greater than the temperature at which said transfer line is maintained), or gases which will not condense with $ZrCl_4$, except for minor amounts by adsorption. Means to collect said condensed phases separately from $ZrCl_4/HfCl_4$ product in a settling chamber, or bag filter condenser, is needed.

DETAILED DESCRIPTION OF THE DRAWINGS

Figure 1:
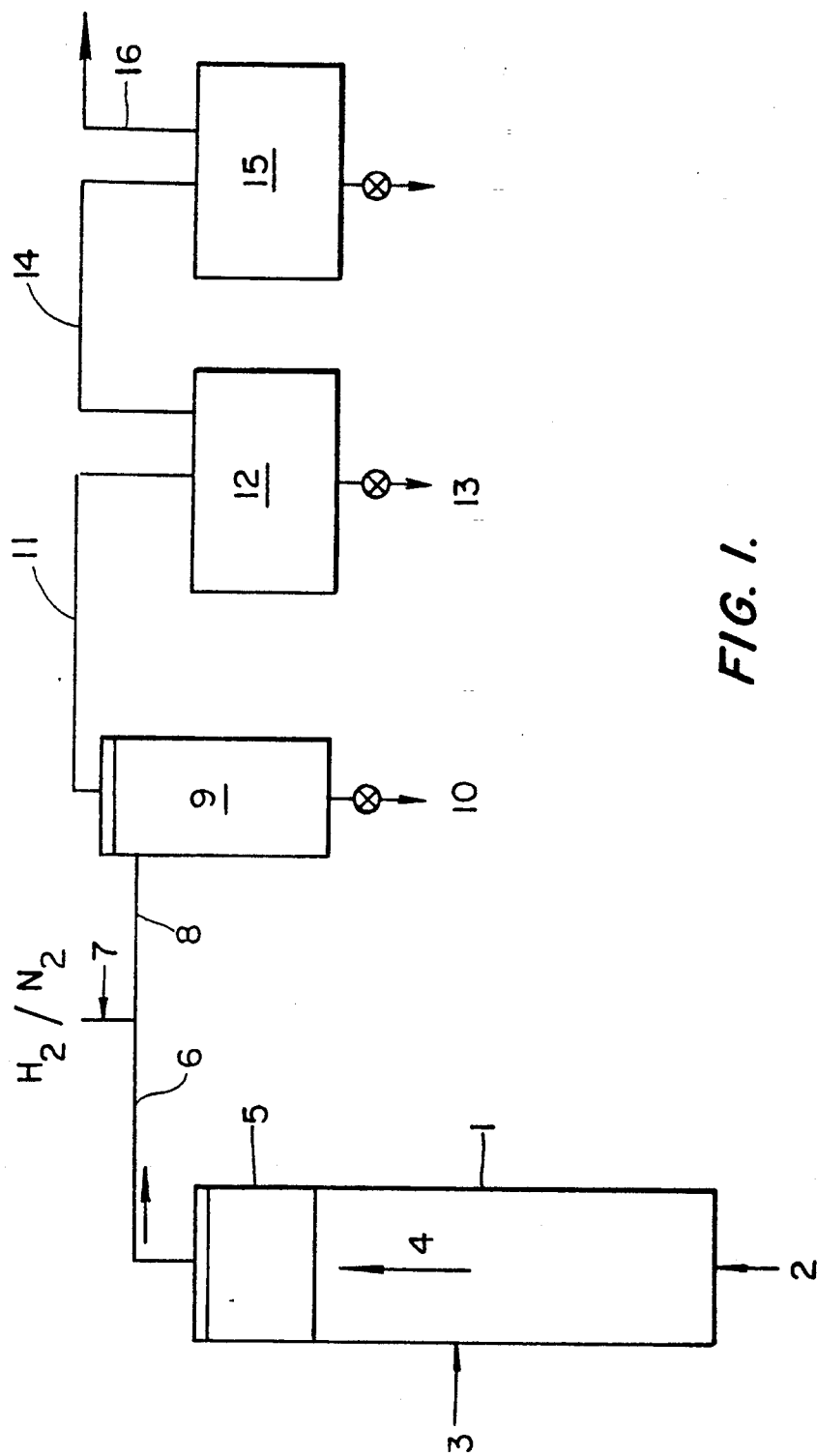
FIG. 1 is a schematic depiction of the chlorination and how the various starting materials and impurities are processed and recovered.

A preferred embodiment of the present invention is illustrated in FIG. 1. Zircon sand and coke 3, mixed together, are fed to a chlorinator 1 maintained at about 1000° C. Chlorine gas 2 is piped into the bottom of chlorinator 1 where the zircon is chlorinated. $Zr/HfCl_4$, $SiCl_4$, $CO$, $CO_2$, $COCl_2$, $Cl_2$ and other volatile impurity chlorides 4, as well as some solids from the reaction zone, leave the reaction zone and contact a primary filter section 5 where most solids are captured and through which chlorinator off-gas passes on to transfer line 6. Hydrogen/nitrogen gas is injected into the hot reactor off-gas at tee 7. Impurities in the reactor off-gas are reduced in transfer line 8 and filter chamber 9. The solids are captured on the filter media and fall to the bottom of the bag house where they are removed through valve 10. The $Zr/HfCl_4$ scrubbed of hydrogen-reducible chloride impurities and solid impurities, but still containing volatile impurities, leaves settling chamber/bag house 9 through transfer line 11. It is then condensed in primary condenser 12 and is removed as a solid through valve 13. Gas exhausted from this primary condenser 12 through transfer line 14 still contains some small amount of $(Zr+Hf)Cl_4$, and so it is desirable to employ a secondary condenser 15, similar to said primary condenser. $SiCl$ and other non-condensible gases pass through this secondary condenser 15 through transfer line 16 and go on for further treatment. The $Zr/HfCl_4$ product from primary condenser 12 is thus remarkably pure and substantially free of impurities, the same as if the material had been sublimed in the conventional manner.

Purifying $Zr/HfCl_4$ of deleterious impurities has been accomplished in a safe, economical and unexpected manner thus avoiding the need for a separate facility where $Zr/HfCl_4(s)$ is fed to a substantial sublimer which requires high energy input, initial high capital costs, substantial maintenance costs, and devoted labor. In fact, the product $ZrHfCl_4$, produced according to the present invention, is already a gas and the only additional energy input required is that which is needed to heat hydrogen/nitrogen gas and that which is necessary to heat the additional transfer lines and dropout chamber/bag house assembly. This is a substantial advantage. No additional labor is necessary. Maintenance costs on the additional transfer lines and dropout chamber/bag house assembly is minimal and substantially less than in a conventional sublimer.

Certain impurities that would normally be removed in subsequent treatment of $Zr/HfCl_4$, depending on its intended use—chemical, non-nuclear metallurgical or nuclear metallurgical—are largely eliminated. This results in increased downstream yields as well as simplification of the process. The separate iron, uranium and phosphorus removal operations required in prior art are no longer necessary.

EXAMPLE 1

Figure 2:
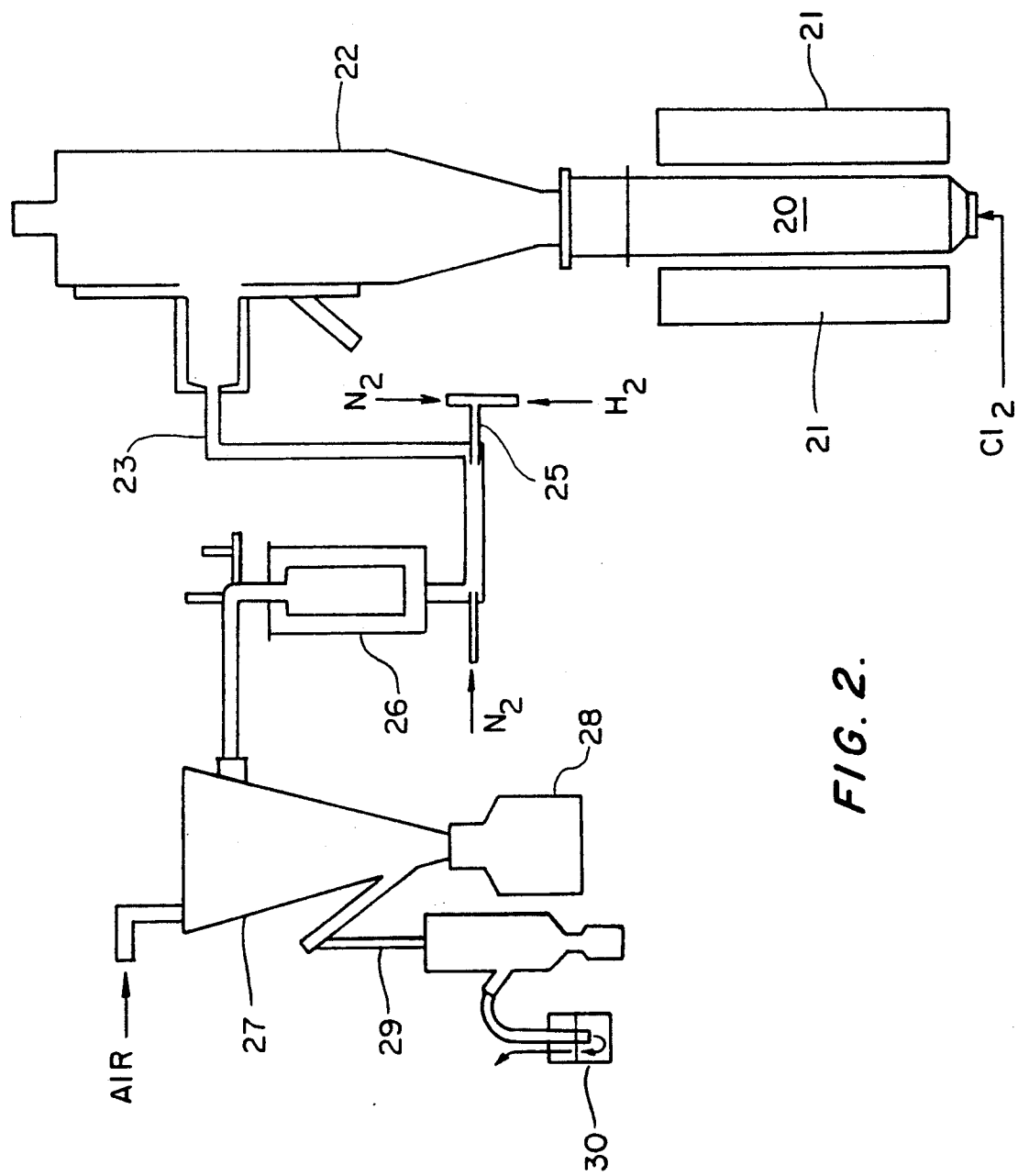
FIG. 2 is a schematic depiction of the actual apparatus constructed for example 1.

The apparatus sketch in FIG. 2 was made from the apparatus as actually constructed. A two inch diameter quartz chlorinator tube 20 fitted at one end with a porous quartz gas distributor by a resistance furnace 21. Gas produced in this tube is conducted through a nickel expansion chamber 22 and mineral wool filter into stainless steel transfer line 23. A 4:1 mixture of nitrogen and hydrogen is injected into this transfer line through stainless steel tubing and a modified union tee fitting 25. The mixed and reacted gas stream is filtered through porous stainless steel filter 26 and introduced to a passively air-cooled conical condenser 27. Condensed product $ZrCl_4$ is collected at the bottom of this vessel at 28, and exhaust gas 29 is scrubbed with sulfuric acid at 30 before leaving the system.

Five hundred grams of finely ground zircon and petroleum coke (in 4:1 ratio) were placed in the chlorinator tube and heated to about 1000° C. in a stream of nitrogen. After reaching this temperature, the nitrogen stream was replaced with 2 l/min chlorine, and reaction between zircon, coke and chlorine began. Nitrogen/hydrogen mixture was provided to the transfer line. Zirconium chloride collected below the condenser appeared white; it was also found to be virtually free of uranium and to have substantially lower amounts of iron and phosphorus. Specifically, analyses of chloride condensed from untreated and hydrogen-reduced chlorinator off-gas are given below.

TABLE 1

|  | Fe (ppm) | P (ppm) | U (ppm) |
|---|---|---|---|
| Untreated | 3100 | 560 | 200 |
| $H_2$-reduced | 74 | 34 | 1.0 |

EXAMPLE 2

The apparatus of Example 1 was provided with a screw feeder in order to provide for continuous addition of zircon:coke feed mix. With this equipment, the chlorination reactor was operated for periods of time up to six hours. A five hundred gram charge of feed mix was placed in the reactor and heated to about 1000° C. under a stream of nitrogen. Upon reaching this temperature, nitrogen was replaced by chlorine, and nitrogen/hydrogen mixture was provided to the transfer line as described in Example 1. In addition, the screw feeder was started, having been adjusted to provide roughly five hundred grams of feed mix per hour. Zirconium chloride was collected below the condenser; the collection bottle was replaced each hour. During the five hour experiment, 1600 g chloride was collected in four samples, three of which appeared white. Chemical analysis (tabulated below) indicates that iron, uranium and phosphorus have been substantially removed from zirconium chloride by the described practice.

TABLE 2

| Time of Sample | Fe (ppm) | U (ppm) | P (ppm) |
|---|---|---|---|
| 1030-1130 | 380 | 1.0 | <50 |
| 1130-1230 | 300 | 3.0 | <50 |
| 1230-1330 | 2300 | 54 | 80 |
| 1430-1530 | 450 | 110 | 60 |

EXAMPLE 3

In order to confirm the discovery on a larger scale, 4% $H_2$ in $N_2$ was introduced into a stream of niobium pentachloride from a chlorinator at approximately 400° C. that contained contaminant iron and phosphorus species. An additional dropout chamber was placed between the hydrogen tee and the bag house chamber. By examining iron and phosphorus content in starting material, and iron and phosphorus/major metal ratios before hydrogen injection and in product, plus residues in the drop out chamber and bag house before filtration, it was clearly obvious that substantial amounts of both iron and phosphorus were removed, substantially improving the quality of the product.

The disclosure of the invention herein is applicable to cleaning reducible impurities other than those specifically disclosed herein in product gases from a chlorinator or halogenation system. Examples of such impurities are tantalum pentachloride, titanium tetrachloride, silicon tetrachloride and the like.

It has been found that the disclosed process for reducing impurities is effective involving metals from Group IV and V and those having atomic weights of from between 14 and 73. In particular these include tantalum, niobium, titanium, silicon, hafnium and zirconium as they exist in the form of their gaseous halides and particularly their chlorides.

The invention has been described with respect to specific embodiments thereof. It will be readily understood that the scope of the claims appended hereto is limited only by the applicable prior art and that a breadth of equivalents is possible where the described parameters for properties are produced.

We claim:

1. A process for decreasing the level of impurities in zirconium chloride, titanium chloride, hafnium chloride or silicon chloride wherein a mixture of ziron sand and petroleum coke are fed together to a chlorinator reaction means, including a chlorinator reactor having inlet means for the introduction of chlorine gas, outlet means for the removal of gaseous metal chlorides, a bottom communicating with said inlet means, a top in communication with said outlet means, a reaction zone between said bottom and aid top and filter means in said top to prevent solids from the top of the reactor vessel from entering said outlet and further comprising condensor means located downstream of said outlet to recover metal chloride product, the improvement comprising:
    (1) maintaining said reaction zone at a temperature of from about 400° C. to about 1000° C.;
    (2) introducing chlorine gas into the bottom of said chlorinator reactor;
    (3) maintaining the top of said reactor at a temperature high enough to maintain the metal chlorides formed in the gaseous state;
    (4) introducing a hydrogen-containing gas into the gaseous metal chloride stream only after it has left the top of the reactor and before reaching the primary condensor means at a temperature above the condensation temperature of the gaseous metal chloride temperature;
    (5) removing from the gaseous metal chloride the condensed reduction products produced by the introduction into the gaseous metal chloride of a reducing amount of a hydrogen-containing gas; and
    (6) subsequent to the removal of the reduction products, recovery by condensation of the substantially pure metal chloride product in the condenser means.

2. The process of claim 1 wherein the metal chloride is zirconium/hafnium tetrachloride, the chlorinator reactor is maintained at about 1000° C.;

3. The process of claim 1 wherein the reducing gas is hydrogen.

4. The process of claim 1 where the solid impurity is an iron compound produced by the reducing gas and is vaporized at a temperature above the temperature of the gaseous stream of the chlorides Si, Hf or Zr sufficient to provide gas solid separation.

5. The process of claim 1 wherein the reactor is heated up to about 1000° C. in the presence of a stream of nitrogen and said nitrogen is replaced with chlorine thereafter.

* * * * *